G. F. GODLEY.
VEHICLE AND LIKE WHEEL.
APPLICATION FILED JULY 18, 1912.
1,074,787.
Patented Oct. 7, 1913.
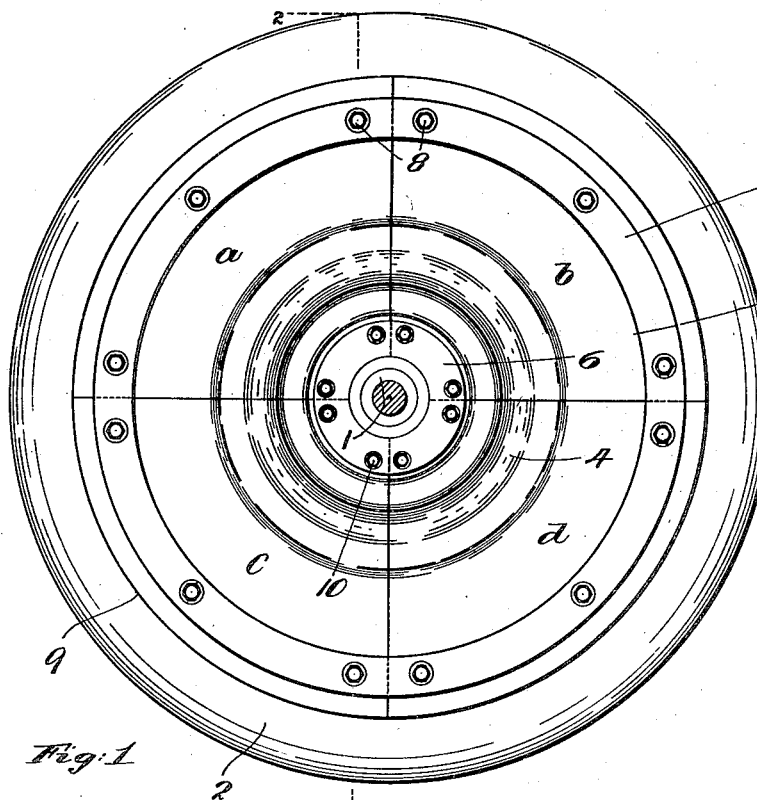
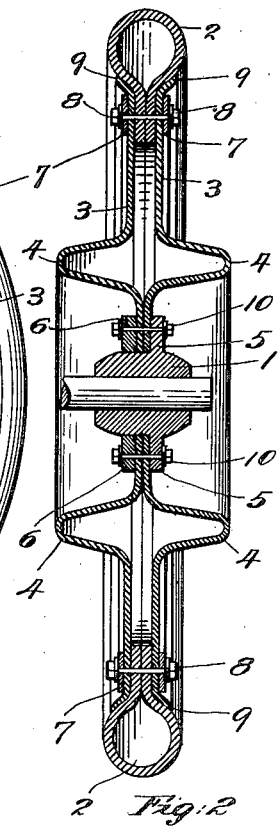
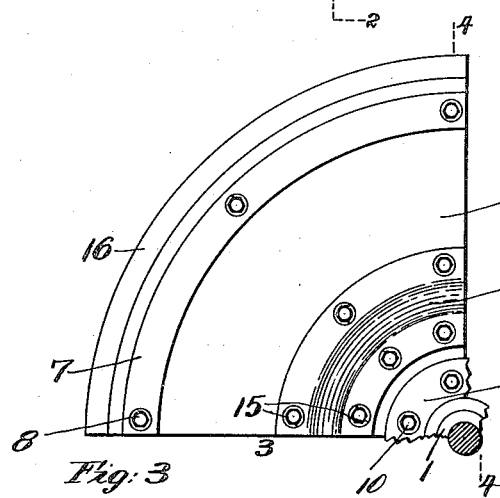
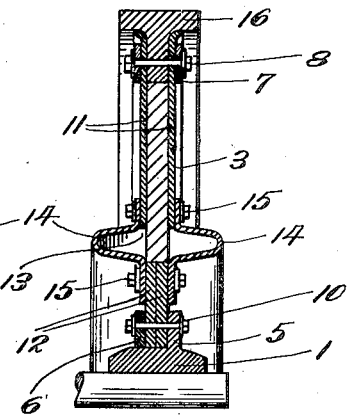
WITNESSES:
INVENTOR.
George F. Godley.
BY
ATTORNEY.

UNITED STATES PATENT OFFICE.

GEORGE F. GODLEY, OF PHILADELPHIA, PENNSYLVANIA.

VEHICLE AND LIKE WHEEL.

1,074,787.

Specification of Letters Patent.     Patented Oct. 7, 1913.

Application filed July 18, 1912.   Serial No. 710,194.

*To all whom it may concern:*

Be it known that I, GEORGE F. GODLEY, a citizen of the United States, residing at Philadelphia, in the county of Philadelphia and State of Pennsylvania, have invented a certain new and useful Improved Vehicle and Like Wheel, of which the following is a specification.

This invention relates and is applicable to carriage, automobile, bicycle, motor-cycle, railway-car or other wheels and the principal object of the present invention may be said to reside in the providing of a wheel of this character, which is light, cheap and strong; relatively rigid in construction, yet possessed of spring or cushion-like qualities, and which is so arranged, connected and constructed as to be readily assembled and dis-assembled for repair purposes.

A further object of the present invention resides in the providing of sectional disk-like supporting frames arranged so as to absorb shocks and jars and prevent transmission thereof to a vehicle, which disk-like supporting frames are adapted for the ready application to and removal therefrom of tires, either rubber, metallic, or other suitable material.

With these and other objects in view, the invention consists of the improvements hereinafter described and finally claimed.

The nature, characteristic features and scope of the invention, will be more fully understood from the following description taken in connection with the accompanying drawing, forming part hereof and in which:

Figure 1, is a view in side elevation of a wheel embodying the invention, Fig. 2, is a view in section taken upon the line 2—2 of Fig. 1, Fig. 3, is a view in elevation of a segment of a wheel embodying a slightly modified form of the invention, and Fig. 4, is a view in section taken upon the line 4—4 of Fig. 3.

Referring to the drawings and more particularly to Figs. 1, and 2, there is shown for the sake of illustration an automobile wheel, in which the hub is designated 1, and the tire 2. Between the tire 2, which is of rubber and the hub 1, there is interposed a pair of disk-like supporting frames or members 3, arranged face to face, see Fig. 2. As shown in Fig. 1, each disk 3, is preferably composed of sections or segments *a, b, c,* and *d*. In practice these disks 3, or more specifically speaking, each of the sections *a, b, c,* and *d*, are constructed of thin sheet metal or the like and are expanded as at 4, in order to provide a yielding cushion-like or spring effect. In other words, the expanded portions 4, of the disks 3, are calculated to render the wheel as a whole of such character that shocks and jars, will be taken up by the parts 4, in contradistinction from being referred to the vehicle. This is true whether the tire 2, be of the pneumatic or of solid type. As shown in Fig. 2, the hub 1, is provided with an annular and fixed flange 5, and a removable hub flange 6. The sections *a, b, c,* and *d,* of each of the disks 3, when in assembled position are connected together adjacent their outer edges by rings 7, and bolts and nuts 8. In this connection it may be remarked that the outer edges of the disks 3, are flared as at 9, for a purpose to be presently described. The disks 3, in assembled position are passed over the hub 1, and caused to abut against the fixed flange 5, thereof. The detachable hub flange 6, is then fitted over the hub 1, and the parts bolted together as at 10, see Fig. 2. In this position, the parts 4, of the disks 3, in cross section are of generally elliptical form and in side elevation provide a raised, rim-like portion. Also, it is to be noted that the respective expanded parts are formed integral with the various sections. The flared portions 9, of the disks 3, provide a suitable receiving socket for the reception of a tire. In this connection, it is to be noted that the inner rims of the rubber tire 2, form a flange which is fitted between the disks 3, and the disks 3, rings 7, and tire flange are secured together by means of the aforesaid bolts and nuts 8.

Referring now to Figs. 3, and 4, the disk-like members 3, are also formed of sections or segments and in addition each section is of three-part construction, see Fig. 4. Each section or segment comprises concentrically arranged plates 11, and 12, spaced apart as at 13. Connecting the spaced plates 11, and 12, of each section are expanded parts 14, forming spring or cushion-like members. These cushion or spring-like members, are bolted as at 15, to said plates 11, and 12. Otherwise, the construction of the wheel is the same as that shown in Figs. 1, and 2. However, a metallic tire 16, is shown as being applied to the wheel.

What I claim is:

In combination a hub having formed integral therewith an annular flange, a tire provided with an inwardly extended flange portion, a pair of relatively flat thin circular plates arranged face to face between said hub and tire, each plate having a single expanded portion arranged intermediate of the inner and outer circumferences of said plate, the combined expanded portions being of generally elliptical cross-section which cross-section is in excess of the cross-section of the tire, the outer peripheral portions of said plates being flared and spaced apart to receive the tire flange and the inner peripheral portions of said plates abutting with each other and one of said plates abutting against the hub flange, a flat ring removably fitted below the flared portion of each plate, a hub flange comprising a flat ring removably fitted over said hub and abutting against the outermost plate and bolts and nuts for clamping said plates between the hub flanges and other bolts and nuts for clamping the tire flange between said plates and said rings, substantially as described.

In testimony whereof, I have hereunto signed my name.

GEORGE F. GODLEY.

Witnesses:
 WILLIAM J. JACKSON,
 AGNES C. CASKEY.